United States Patent
Kishita et al.

(10) Patent No.: US 6,530,426 B1
(45) Date of Patent: Mar. 11, 2003

(54) MOTOR DRIVE-CONTROL DEVICE

(75) Inventors: Hiroshi Kishita, Anjo (JP); Yasuhiko Niimi, Handa (JP); Yasushi Yamanaka, Nakashima-gun (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 09/548,028

(22) Filed: Apr. 12, 2000

(30) Foreign Application Priority Data

Apr. 15, 1999 (JP) .......................................... 11-108455

(51) Int. Cl.$^7$ ........................... F25B 29/00; B60H 1/00; B60L 1/00; B60L 11/18; B60K 17/02
(52) U.S. Cl. ........................... 165/202; 165/42; 165/43; 165/271; 62/236; 62/228.1; 62/323.1; 62/323.4; 237/12.3 R; 237/12.3 B; 180/53.8; 180/65.4; 180/69.3; 180/65.2; 180/65.3; 290/4 C; 123/339.17; 123/339.18
(58) Field of Search ............................... 62/236, 323.1, 62/323.4; 165/202, 42, 43, 271; 237/12.3 R, 12.3 B; 180/53.8, 65.4, 65.3, 65.2, 69.3; 290/4 C; 123/339.17, 339.18

(56) References Cited

U.S. PATENT DOCUMENTS

| | | | | |
|---|---|---|---|---|
| 2,467,077 A | * | 4/1949 | Brunken | |
| 2,963,923 A | * | 12/1960 | Kelley et al. | |
| 3,157,066 A | * | 11/1964 | Donley et al. | |
| 3,587,237 A | * | 6/1971 | Pierrat | |
| 3,715,005 A | * | 2/1973 | Byram et al. | |
| 3,999,373 A | * | 12/1976 | Bell, III et al. | |
| 4,354,466 A | * | 10/1982 | Dudley et al. | |
| 4,546,742 A | * | 10/1985 | Sturges | 123/41.33 |
| 5,558,173 A | * | 9/1996 | Sherman | |
| 5,771,478 A | * | 6/1998 | Tsukamoto et al. | |
| 5,947,854 A | * | 9/1999 | Kopko | |
| 6,227,153 B1 | * | 5/2001 | Till | |
| 2001/0017110 A1 | * | 8/2001 | Ap et al. | 123/41.1 |

FOREIGN PATENT DOCUMENTS

| | | |
|---|---|---|
| JP | A-5-139182 | 6/1993 |
| JP | A-7-35101 | 2/1995 |
| JP | A-9-182209 | 7/1997 |
| JP | A-9-215101 | 8/1997 |
| JP | 11-235925 | * 8/1999 |

* cited by examiner

Primary Examiner—John K. Ford
(74) Attorney, Agent, or Firm—Harness, Dickey & Pierce, PLC

(57) ABSTRACT

A motor drive-control device drive-controls a plurality of auxiliary devices with a single motor while securing a necessary capacity of the auxiliary devices side in correspondence with usage conditions. As such, in an air-conditioning system, necessary speeds of auxiliary devices such as a compressor and a warm water pump are calculated based on a necessary cooling capacity and a necessary heating capacity. The higher of these two necessary speeds is set as the motor speed for driving the auxiliary devices. The motor is thus controlled to this speed. Therefore, even if the air-conditioning heat load varies greatly due to changes in the usage environment, cooling and heating capacities necessary for air-conditioning temperature control can be obtained at all times.

6 Claims, 6 Drawing Sheets

MOTOR DRIVE-CONTROL DEVICE

CROSS-REFERENCE TO RELATED APPLICATION

The present invention is related to and claims priority from Japanese patent application No. Hei. 11-108455, filed Apr. 15, 1999; the contents of which are incorporated herein by reference.

FIELD OF THE INVENTION

The present invention relates to a device for driving and controlling a plurality of auxiliary devices with a single motor, and particularly to a motor drive-control device for driving and controlling a compressor and a warm water pump in a vehicle air-conditioning system.

BACKGROUND OF THE INVENTION

Generally, in vehicle air-conditioning systems, refrigerant is circulated around a refrigerating cycle by a compressor, driven by power transmitted by a belt from a vehicle engine. Likewise, a warm water pump circulates warm water through a heater core and through a radiator. The heater core is for space-heating and the radiator is for removing heat from cooling water. The warm water pump is belt-driven by the vehicle engine. While this system works well, it has drawbacks when applied to certain types of vehicles.

Recently, vehicles such as hybrid cars have been developed. In this type of vehicle, when the vehicle comes to a stop, the engine also stops. As such, with a conventional drive mechanism, the compressor and warm water pump also stop running. Therefore, it is not possible to perform their associated space-cooling and space-heating functions.

To overcome this drawback, it is conceivable for the compressor and other elements to be driven with an electric motor during vehicle stops. Such driving is accomplished by using electrical energy stored in a battery. This energy is stored in the battery by a generator driven by the engine when the vehicle is moving. However, with respect to an air-conditioning system, the delivery capacities of the compressor and the warm water pump are preferably controlled responsive to the air-conditioning heat load. This enhances space-cooling and space-heating capacity and saves energy.

Japanese Unexamined Patent Publication No. H.9-215101 proposes a power transmitting clutch, positioned between driving wheels and a motor, which disengages the two. Such a device, for an electric car, disengages the wheels from the motor when the vehicle comes to a stop. With respect to demands of auxiliary devices, the motor is driven and controlled at an efficient speed. Therefore, auxiliary devices, such as generators (alternators), power steering pumps, negative pressure pumps, and an air-conditioning compressors are driven during vehicle stops.

However, in this technology, the motor speed is controlled to improve the motor efficiency. As such, the necessary capacity of the auxiliary devices cannot be changed with respect to changing auxiliary usage conditions. The present invention was developed in light of these drawbacks.

SUMMARY OF THE INVENTION

It is therefore an object of the present invention to drive and control a plurality of auxiliary devices with a single motor while obtaining the necessary capacity of the auxiliary corresponding to usage conditions.

To achieve this and other objects, a motor drive-control device is provided which chooses a higher of two parameters as a motor speed. The necessary speeds for a plurality of auxiliary devices is calculated. The highest of the necessary speeds is set as the auxiliary drive motor speed, and the drive motor is driven at this speed.

Therefore, in driving a plurality of auxiliary devices with a single motor, even if the usage conditions of the plurality of auxiliary devices change, the auxiliary devices can be motor-driven at the highest of the necessary speeds. By this means, it is possible to obtain the necessary capacity of the auxiliary side at all times, irrespective of changes in the usage conditions. In another aspect of the present invention, instead of motor, the plurality of auxiliary devices can be driven by engine.

In an air-conditioning system according to a second aspect of the invention, one of the auxiliary devices relates to cooling capacity and another auxiliary device relates to heating capacity. The necessary speeds of the cooling and heating devices are calculated based on the necessary cooling capacity and the necessary heating capacity.

These speeds are calculated independently, and the higher of the two speeds is set as the motor speed. Consequently, even if the air-conditioning heat load fluctuates greatly due to a large change in the usage environment, it is possible for cooling and heating capacities required by air-conditioning temperature control to be obtained at all times.

In an air-conditioning system set forth in a third aspect of the present invention, the auxiliary device relating to a cooling capacity is a compressor, and the device relating to heating capacity is a warm water water pump. The compressor is for a refrigeration cycle and the warm water pump is for circulating warm water. An evaporator, through which refrigerant of the refrigerating cycle circulates, and a heater core, through which warm water circulates, are disposed in an air-conditioning case. Air-conditioning case forms a passage through which air-conditioning air flows. Both auxiliary devices have completely different characteristics, requiring two different operating speeds. However, both are driven by a single motor. Therefore, necessary cooling and heating capacities can be obtained at all times by operating the motor at the higher required speed.

In a fourth aspect of the present invention, a temperature adjusting means for adjusting the amount of heat delivered by the heater core, is provided. As such, it is possible to freely adjust the outlet temperature of the air blown into a passenger compartment by adjustment of the heater core.

In a fifth aspect of the present invention, the compressor and the warm water pump are also driven by a vehicle engine, besides the motor. Therefore, when the compressor and the warm water pump are driven by the vehicle engine, the motor is driven by the vehicle engine and acts as a generator. That is, during driving by the vehicle engine, the motor for driving auxiliary devices can become a generator and charge a vehicle-mounted battery.

In a sixth aspect of the present invention, a first necessary warm water pump speed (Nmw1) is calculated based on a necessary heating capacity, and a second necessary warm water pump speed (Nmw2) is calculated which rises corresponding to the warm water temperature of the vehicle engine. The higher the two speeds is set as a necessary warm water pump speed (Nmw).

Thus, when the warm water temperature of the vehicle engine rises, the second necessary warm water pump speed (Nmw2) is set as the necessary warm water pump speed (Nmw). The warm water pump speed is increased to increase the flow of warm water to the cooling water radiator, thereby preventing overheating of the vehicle engine.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
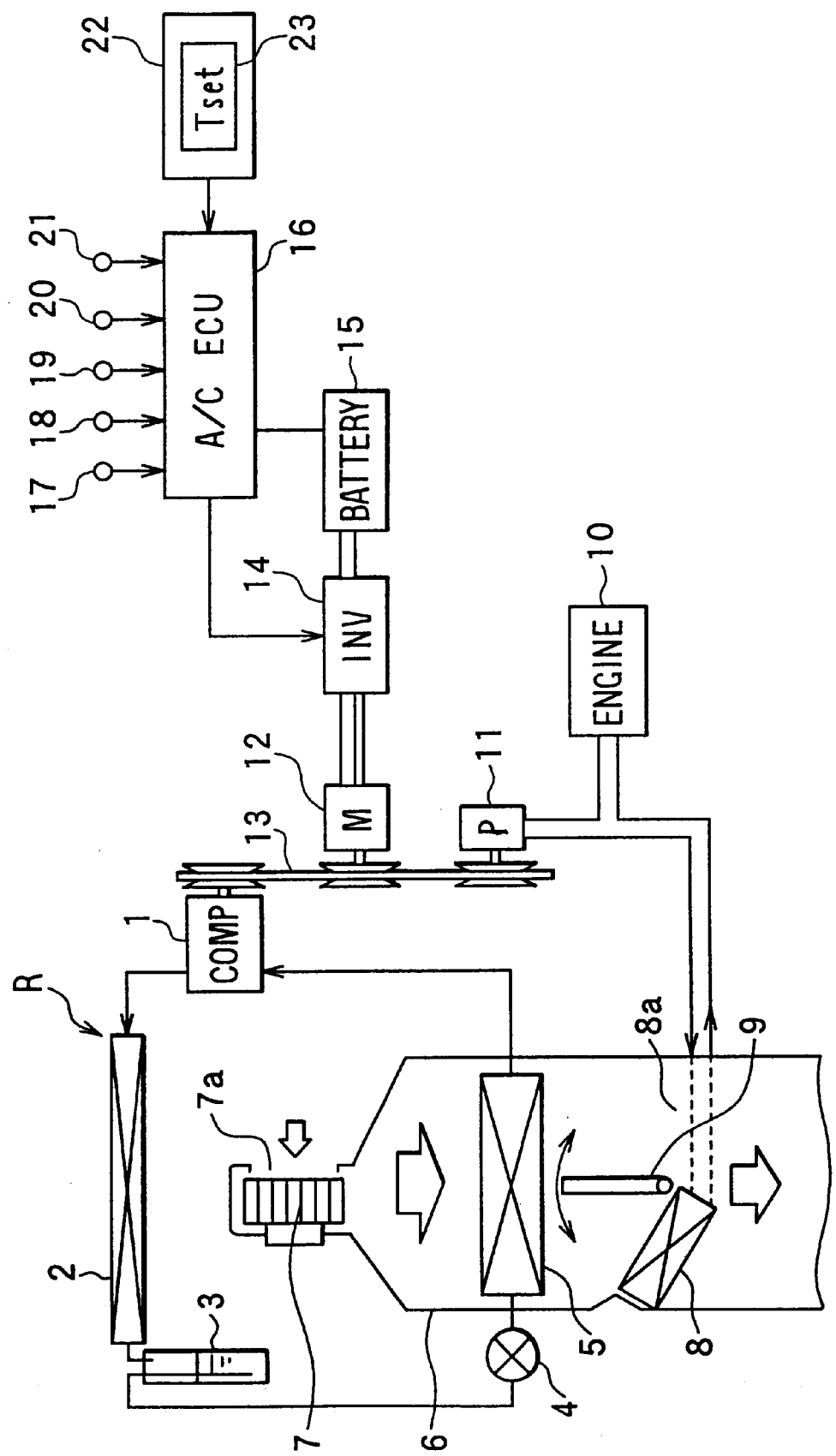
FIG. 1 is a diagramatical view of a first embodiment for a vehicle air-conditioning system for a motor drive-control device according to the invention.

FIG. 1 shows the overall construction of a first embodiment of the present invention. Here, the invention is applied to a vehicle air-conditioning system in a hybrid vehicle. The hybrid vehicle has both an engine and a motor as a drive source for automotive travel. In FIG. 1, an ordinary refrigerating cycle R for air-conditioning is made up of a compressor 1, a condenser 2, a liquid receiver 3, an expansion valve 4 (constituting a pressure-reducing means), and an evaporator 5.

An air-conditioning case 6 forms a passage through which air-conditioning air flows. Therefore, the evaporator 5 is disposed in air-conditioning case 6. Evaporator 5 is a cooling heat-exchanger for cooling air-conditioning air. A gas/liquid two-phase refrigerant flowing through evaporator 5, at a low pressure, cools air (delivered by a blower 7) by absorbing heat from the air and evaporating. Either inside or outside air is drawn into an intake opening 7a, of the blower 7, through an inside/outside air switching box (not shown). A heater core 8 is disposed on the downstream side of the evaporator 5, inside the air-conditioning case 6.

The heater core 8 is a heat-exchanger which uses warm water to heat air-conditioning air. Inside the air-conditioning case 6, a bypass passage 8a is formed beside (above) the heater core 8. To adjust the flow proportions of a cool draft passing through this bypass passage 8a and warm the draft air passing through the heater core 8, a plate-shaped air-mixing door 9 is pivotally mounted adjacent to the heater core 8.

Air, brought to a desired temperature by mixing these cool and warm drafts, passes through an outlet mode switching mechanism and is blown out into the passenger compartment of the vehicle. Warm water (cooling water) from a vehicle engine 10 is circulated through the heater core 8 by a warm water pump 11. Here, the vehicle engine 10 fulfills the role of a warm water heat source for the heater core 8. However, instead of the vehicle engine 10, another warm water heat source such as a fuel-burning heater may alternatively be used.

A motor 12, for driving auxiliary devices, drives the compressor 1 and the warm water pump 11 through a transmission mechanism using a belt 13. The motor 12 in this example is a three-phase a/c motor supplied with a three-phase a/c voltage by an invertor 14. As such, the motor speed can be continuously adjusted by adjusting the frequency of this three-phase a/c voltage by means of the invertor 14.

The invertor 14 is supplied with a d.c. voltage from a vehicle battery 15 and performs frequency control of the motor 12 on the basis of a signal from an air-conditioning control unit 16. The air-conditioning control unit 16 is made up of a microcomputer and its peripheral circuits. A plurality of sensors are connected to the air-conditioning control unit 16 as input sensors. These sensors include an outside air temperature sensor 17 for detecting an outside air temperature Tam, an inside air temperature sensor 18 for detecting passenger compartment temperature Tr, a solar radiation sensor 19 for detecting a level Ts of solar radiation entering the passenger compartment, an evaporator temperature sensor 20 for detecting a temperature (exit temperature) Te of the evaporator 5, and a water temperature sensor 21 for detecting a warm water temperature Tw of the heater core 8.

Also, control switches, such as a temperature setter 23, are provided on an air-conditioning control panel 22. Temperature setter 23 is for setting a desired temperature Tset for the passenger compartment. The control switches are mounted in the vicinity of a dashboard in the passenger compartment. The control signals from these control switches are input into the air-conditioning control unit 16.

Figure 2:
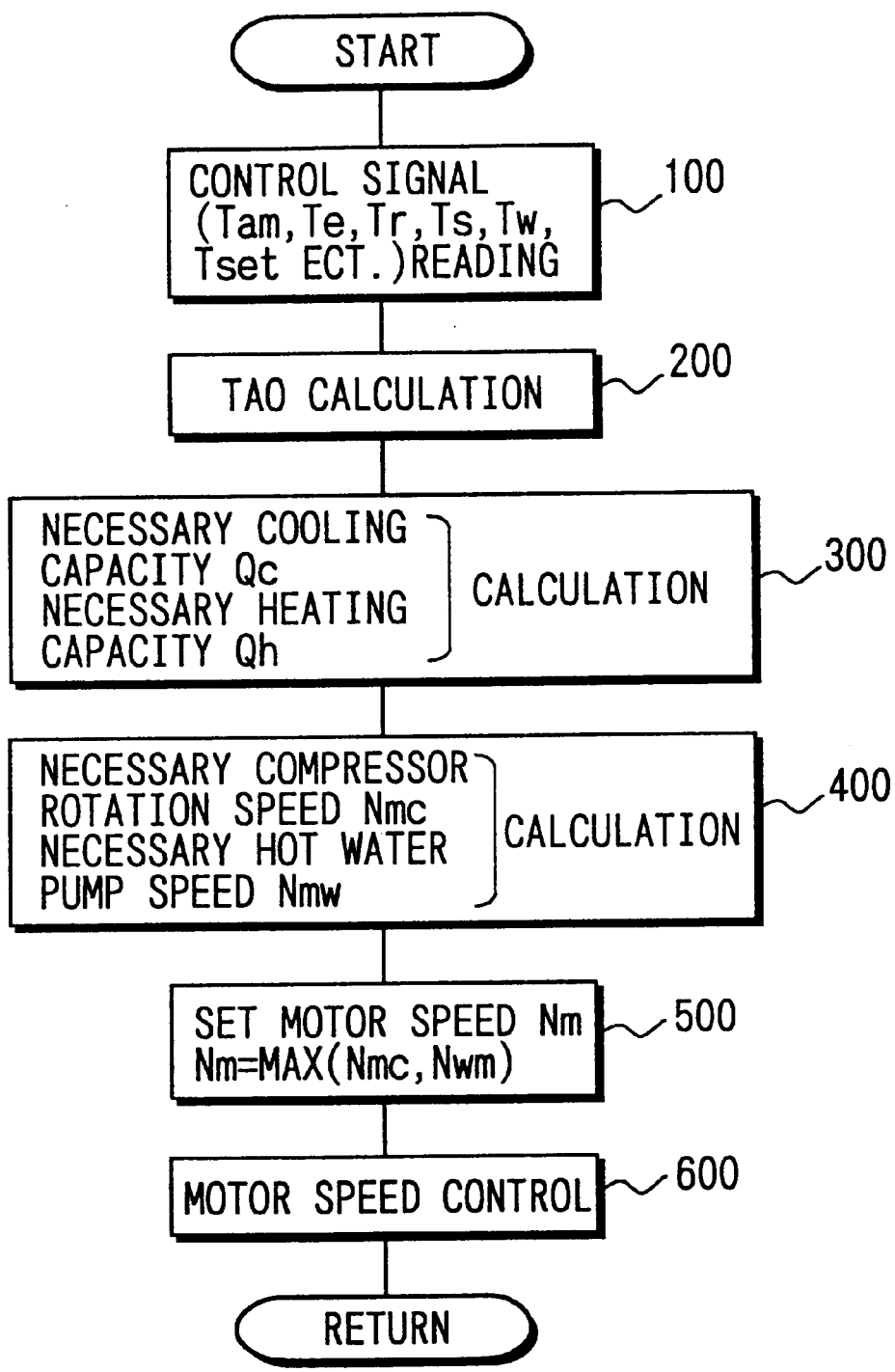
FIG. 2 is a flow chart depicting the operation of the first embodiment for a motor drive-control device according to the present invention.

The operation of the present invention will now be explained. FIG. 2 shows a control routine executed by the microcomputer of the air-conditioning control unit 16. This control routine starts when an operating (AUTO) switch (not shown), provided in the air-conditioning control panel 22 is turned on. In step 100, the outside air temperature Tam, the inside air temperature Tr, the solar radiation Ts, the warm water temperature Tw, the desired temperature Tset and the evaporator exit temperature Te are read in.

Processing then proceeds to step 200 and calculates a target outlet temperature TAO. This target outlet temperature TAO is the outlet temperature necessary to maintain the passenger compartment at the desired temperature Tset, and corresponds with the air-conditioning heat load. The target outlet temperature TAO can be obtained as a function of Tset, Tr, Tam and Ts as shown by the following Eq. 1.

$$TAO = f1(Tset, Tr, Tam, Ts) \qquad \text{Eq. 1}$$

Next, the processing of FIG. 2 proceeds to step 300, and calculates a necessary cooling capacity Qc and a necessary heating capacity Qh on the basis of the target outlet temperature TAO. Here, in this example, the necessary cooling capacity Qc is obtained from a target evaporator outlet temperature TEO.

As a specific method for calculating a target evaporator outlet temperature TEO, TEO can be calculated on the basis of a first target evaporator outlet temperature TEO1 and a second target evaporator outlet temperature TEO2 as discussed below.

Figure 3:
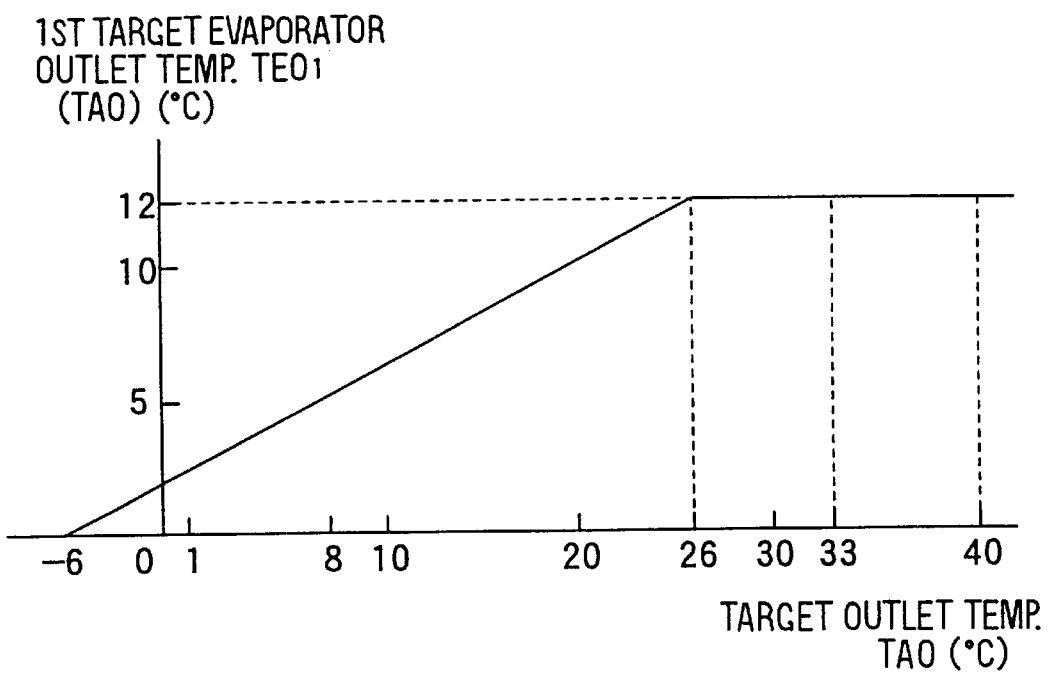
FIG. 3 is a graphic view showing, a first target evaporator outlet temperature for a motor drive-control device according to the first embodiment of the present invention.

First, with respect to first target evaporator outlet temperature TEO1, FIG. 3 is a preset chart stored in a ROM of the microcomputer. On the basis of this chart, the first target evaporator outlet temperature TEO1 is set as a function of TAO. Thus, TEO1=f(TAO). In this example, to prevent unpleasant odors in the evaporator 5, TEO1 has an upper limit of 12 C.

Figure 4:
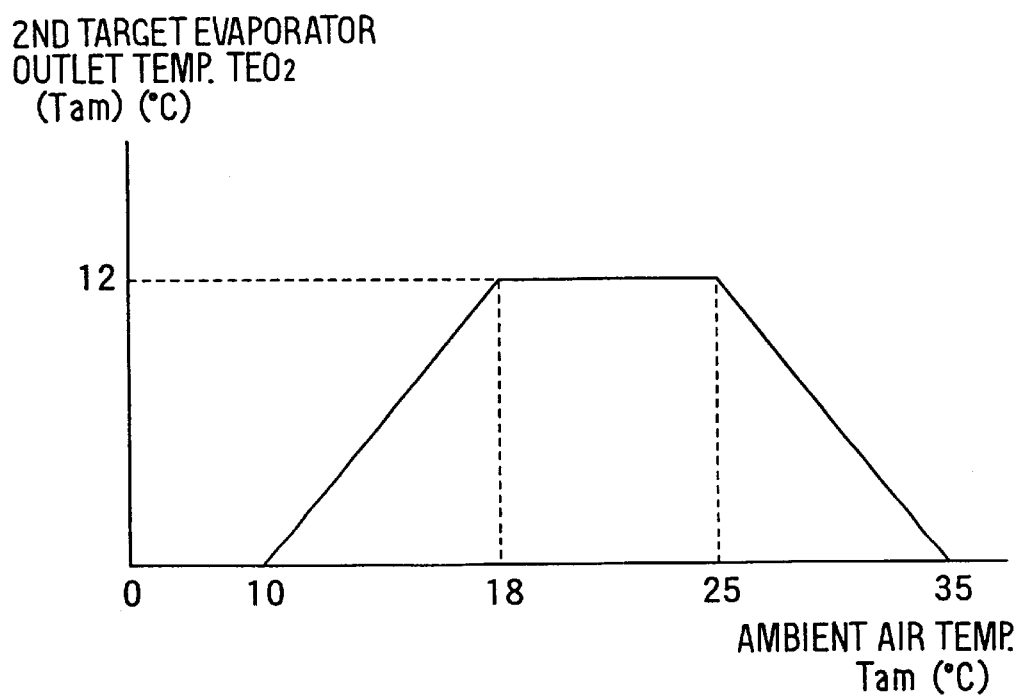
FIG. 4 is a graphic view showing a second target evaporator outlet temperature for a motor drive-control device according to the first embodiment of the present invention.

Next, the second target evaporator outlet temperature TEO2 is also determined on the basis of a preset chart stored in ROM. This chart is illustrated in FIG. 4. The second target evaporator outlet temperature TEO2 is determined in correspondence with the outside air temperature Tam. For example, in an intermediate temperature range of the outside air temperature Tam (in the example shown in FIG. 4, 18 C to 25 C), the second target evaporator outlet temperature TEO2 is.made high (in the example of FIG. 4, 12 C) to reduce the necessary speed of the compressor 1. The reason for this is because there is less necessity for cooling and dehumidification in this situation. The power consumption for driving the compressor is thereby reduced.

On the other hand, during summer high temperatures when the outside air temperature Tam exceeds 25 C, the second target evaporator outlet temperature TEO2 decreases inversely to the rising outside air temperature Tam This decrease secures cooling capacity. During low temperatures, such as when the outside air temperature Tam is below 18 C, the second target evaporator outlet temperature TEO2 decreases with falling outside air temperature Tam to ensure dehumidification capacity. This decrease prevents window glass fogging. Thus it can be written that TEO2=f(Tam).

Then, as shown in Eq. 2, either the first target evaporator outlet temperature TEO1=f(TAO) or the second target evaporator outlet temperature TEO2=f(Tam), which ever is lower, is set as the target evaporator outlet temperature TEO.

$$TEO=MIN\{f(TAO), f(Tam)\} \quad \text{Eq. 2}$$

On the other hand, because the level of the target outlet temperature TAO is directly related to the necessary heating capacity Qh, the necessary heating capacity Qh can be set on the basis of TAO (Qh=f(TAO)).

Next, in step 400 in FIG. 2, a necessary compressor speed Nmc is set on the basis of the necessary cooling capacity Qc. More specifically, the difference En (En=TEO−Te) between the target evaporator outlet temperature TEO and the actual evaporator exit temperature Te is obtained at predetermined time intervals (for example four seconds). The rate of change EDOT of this difference En is further obtained, using the following Eq. 3.

$$EDOT=En-En_{-1} (En_{-1} \text{ being the value four seconds earlier}). \quad \text{Eq. 3}$$

Then, based on En and the rate of change of difference EDOT, a target change delta f in the compressor speed for bringing the evaporator exit temperature Te to the target evaporator outlet temperature TEO is determined by known fuzzy control. Thus, the necessary compressor speed Nmc can be expressed using the following Exp. 4.

$$Nmc=\text{present compressor speed } Nc+\text{target speed change delta f.} \quad \text{Eq. 4}$$

When starting the compressor 1, either a predetermined estimated preset speed or a speed of zero is input as Nc.

Figure 5:
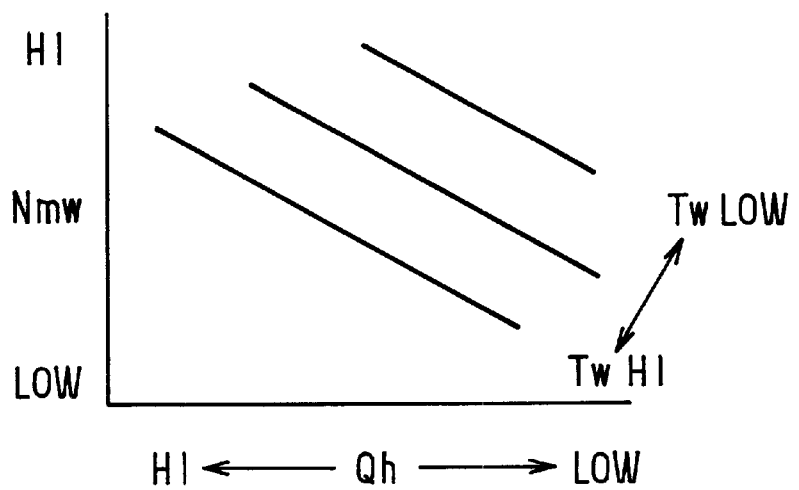
FIG. 5 is a graphic view of a necessary warm water pump speed for a motor drive-control device according to the present invention.

Next, the chart of FIG. 5, which is preset and stored in the ROM of the microcomputer, is used for calculating a necessary warm water, pump speed Nmw on the basis of the necessary heating capacity Qh and the warm water temperature Tw. As shown in FIG. 5, the higher value is Qh, and the lower value is the warm water temperature Tw. As such, the higher value is made the necessary warm water pump speed Nmw.

Next, processing proceeds to step 500, and sets the higher of the necessary compressor speed Nmc and the necessary warm water pump speed Nmw as the speed Nm of the motor 12 for driving auxiliary devices.

Then, in step 600, speed control of the motor 12 is set such that the actual speed of motor 12 approaches the abovementioned speed Nm. That is, frequency control of invertor 14 is carried out to control the motor speed 12. For example, in midsummer, operation of the warm water pump 11, for heating, is unnecessary. Whereas, it is necessary for compressor 1 to be operated at full tilt for cooling. Therefore, because the necessary compressor speed Nmc of the compressor 1 is high, 1000 rpm, the motor speed Nm is set at 1000 rpm.

Conversely, in midwinter, cooling action is not needed. As such, the necessary compressor speed Nmc becomes 0 rpm. However, to obtain heating, the necessary warm water pump speed Nmw of the warm water pump 11 becomes 700 rpm. As such, the motor speed Nm is set to 700 rpm. In the intermediate seasons of spring and fall, the motor speed Nm is controlled corresponding to the necessary cooling or heating capacity of that time.

As will be understood from the foregoing operation description, with this first preferred embodiment, a necessary compressor speed Nmc and a necessary warm water pump speed Nmw are calculated independently on the basis of a necessary cooling capacity Qc and a necessary heating capacity Qh respectively. Also, the higher of the necessary compressor speed Nmc and the necessary warm water pump, speed Nmw is set as the motor speed Nm. Therefore, even if the air-conditioning heat load fluctuates greatly due to large fluctuations in the usage environment of the vehicle, it is possible for cooling and heating capacities necessary for temperature control of the passenger compartment to be obtained at all times.

Thus, in a drive device using a single motor 12, two auxiliary devices having completely different characteristics, such as a compressor 1 for cooling capacity and a warm water pump 11 for heating capacity, the present invention provides enhanced cooling capacity and heating capacity.

By adjusting the aperture of the air-mixing door 9, provided beside (above) the heater core 8 In the air-conditioning case 6, it is possible to adjust the flow proportions of a cool draft passing through the bypass passage 8a and a warm draft passing through the heater core 8. Thus, the outlet temperature to the passenger compartment is controlled well. Instead of using air-mixing door 9, a warm water valve for adjusting the flow, of warm water to the heater core 8, provided in the warm water circuit, may be used to control the outlet temperature to the passenger compartment.

In FIG. 2, step 200 provides a target outlet temperature calculating means. Step 300 provides a necessary cooling capacity and necessary heating capacity calculating means. Step 400 provides a necessary compressor speed and necessary warm water pump speed calculating means. Step 500 provides a motor speed determining means. Lastly, step 600 provides motor control means.

Figure 6:
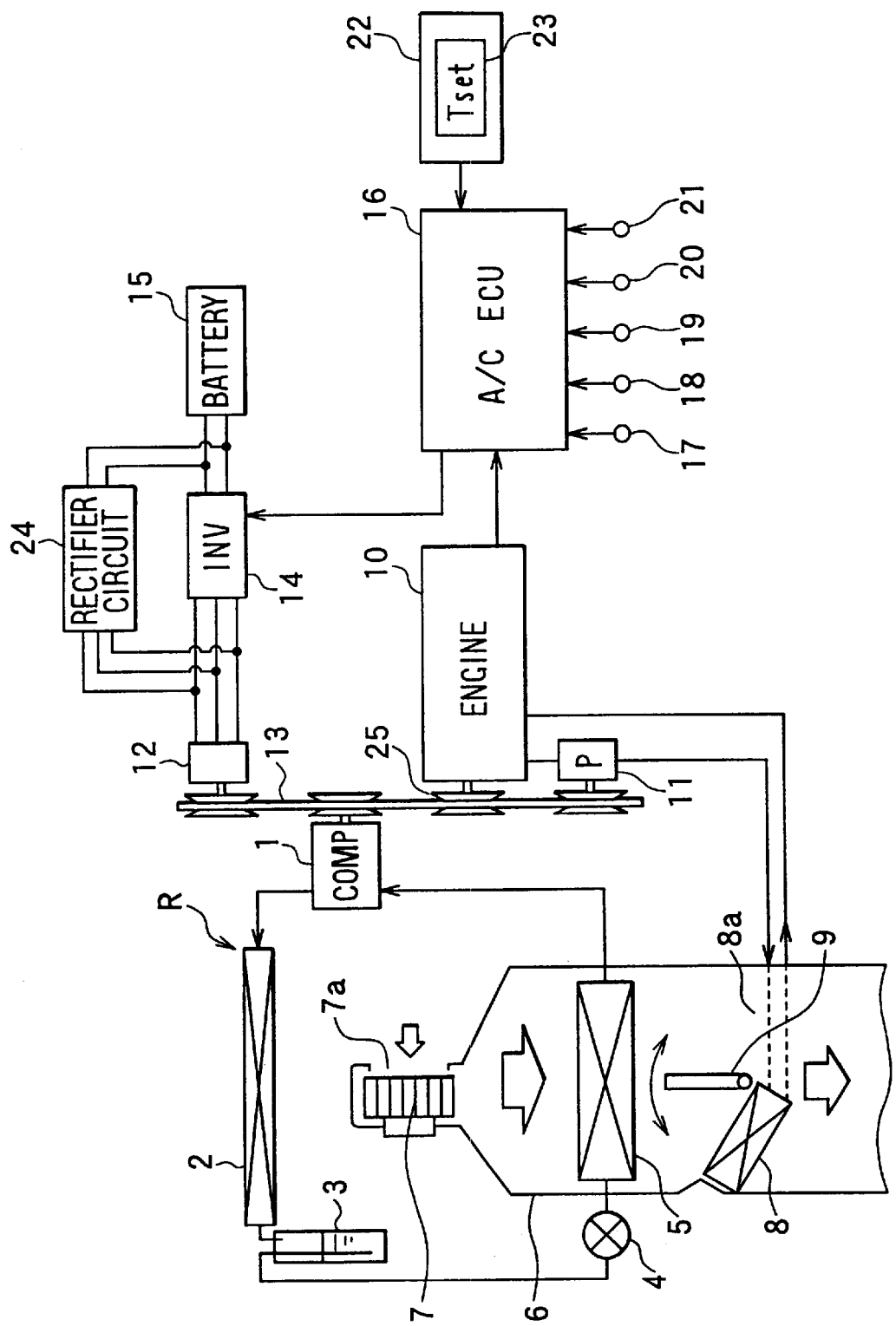
FIG. 6 is a diagramatical view of a vehicle air-conditioning system for a motor drive-control device according to a second embodiment of the present invention.

FIG. 6 is an overall system diagram of a second embodiment of the present invention. Here, a compressor 1 and a warm water pump 11 are driven in a hybrid fashion by both a vehicle engine 10 and a motor 12. That is, in this second preferred embodiment, when the vehicle engine 10 has stopped for example, because the vehicle has halted, the compressor 1 and the warm water pump 11 are driven by the motor 12. However, while the vehicle engine 10 is operating (while the vehicle is traveling), the compressor 1 and the warm water pump 11 are driven by the vehicle engine 10.

When the compressor 1 and the warm water pump 11 are being driven by the vehicle engine 10, the motor 12 acts as a generator driven by the vehicle engine 10. That is, in this second preferred embodiment, the motor 12 is a motor/generator, which doubles as a generator. This motor/generator 12 is a 3-phase a/c machine. As such, when operating as a motor, it becomes a 3-phase a/c motor developing a torque in an armature under a 3-phase a/c voltage. The voltage is supplied from the invertor 14. When operating as a generator, the motor/generator 12 becomes a 3-phase a/c generator producing an electromotive force by the armature being driven by the vehicle engine 10.

The 3-phase a/c voltage provided by the generating action of the motor/generator 12 is rectified by a rectifier circuit 24 into a direct current. This direct current is used to charge the vehicle battery 15.

A clutch mechanism for transmitting rotational power from the vehicle engine 10 side to the auxiliary devices (1, 11, 12) side only and blocking power transmission from the motor/generator 12 to the vehicle engine 10 side is provided on a pulley 25 of the vehicle engine 10. A simple mechanical one-way clutch can be used as this clutch mechanism, or instead of a one-way clutch an electromagnetic clutch can alternatively be used.

Figure 7:
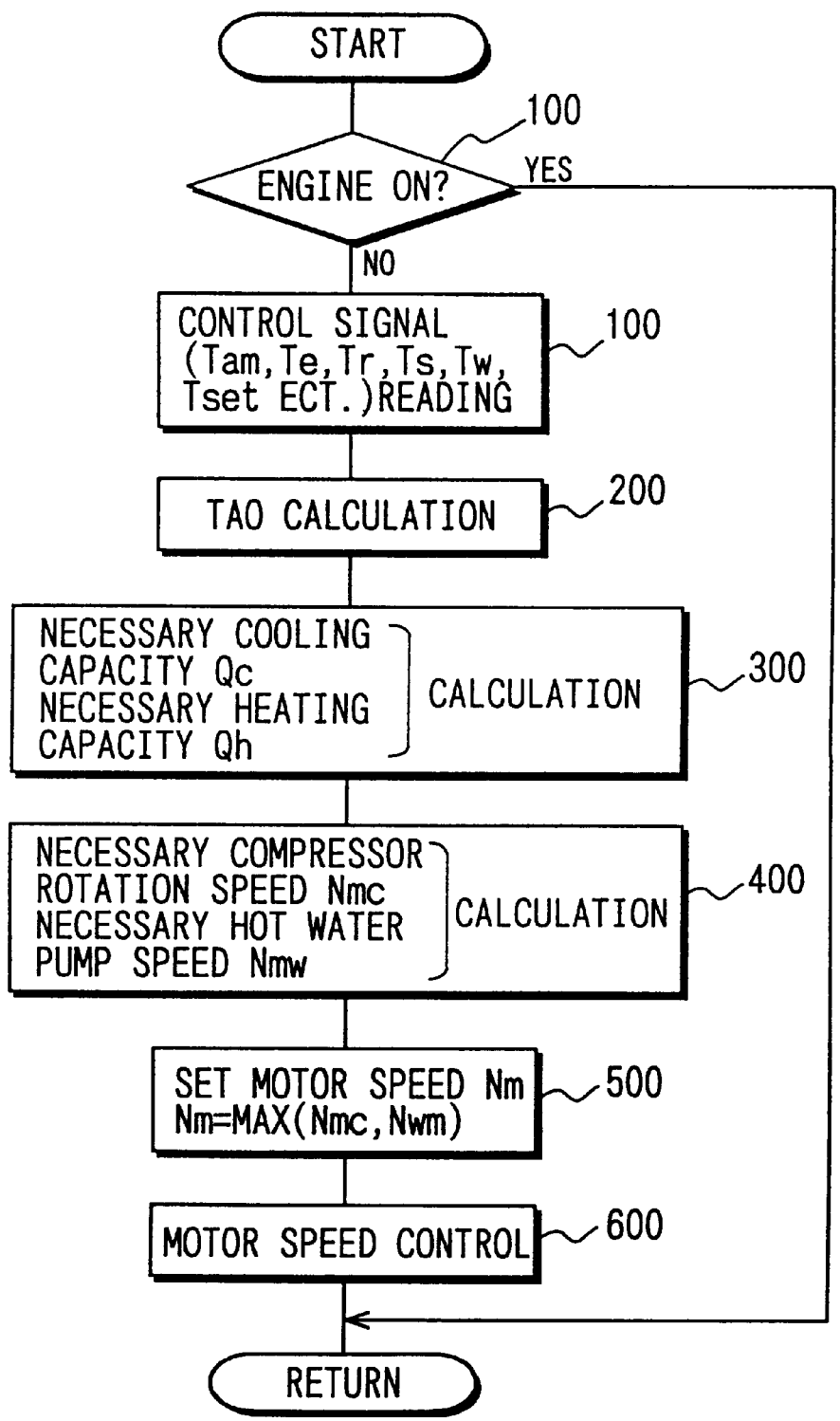
FIG. 7 is a control flow chart for a motor drive-control device according to a second embodiment of the present invention.

FIG. 7 is a control flow chart pertaining to the second embodiment. Referring to FIG. 2, before step 100, a step 90 is executed for determining whether the vehicle engine 10 is running or stopped. When the vehicle engine 10 is stopped, the same motor speed control as that of FIG. 2 is carried out. When, alternatively, the vehicle engine 10 is running, the motor speed control is not carried out. This is because the motor/generator 12 acts as a generator Preferably, in this embodiment, a variable-capacity compressor is used as the compressor 1. That is, when the auxiliary devices (1, 11, 12) are driven with the vehicle engine 10, the vehicle engine 10 has a markedly greater output torque than the motor. The vehicle engine 10 is also often used at a lower speed than the motor. Accordingly, when vehicle engine 10 is driving, the capacity of the compressor 1 is made large (drive torque being large) to obtain the necessary cooling capacity.

Alternatively, when auxiliary devices (1, 11) are driven with the motor/generator 12, the capacity of the compressor 1 is made small (that is, drive torque: small). This is because the motor drive torque is markedly smaller compared to the vehicle engine 10. To compensate, the speed of the compressor 1 is increased during the motor drive to obtain the necessary cooling capacity.

If a variable-capacity compressor 1 is used like this, when the auxiliary devices (the compressor 1 and the warm water pump 11) are driven in a hybrid fashion by the vehicle engine 10 and the motor/generator 12, a compressor drive format utilizing the characteristics of two different drive sources can be established. As the variable-capacity compressor 1, any of various types such as an ordinary swash-plate type or scroll type can be used.

On the other hand, because the drive torque of the warm water pump 11 is much smaller than that of the compressor 1, it is not necessary for this to be a variable-capacity type.

Also, because the warm water pump 11 has a predetermined fixed capacity, the optimum speed ratio between the compressor 1 and the warm water pump 11 varies greatly between times of engine drive and times of motor drive.

That is, if the pulley ratio of the belt 13 is set to provide an optimum speed ratio (for example 1:2) between the compressor 1 and the warm water pump 11 is required during engine drive, then by the variable-capacity compressor 1 being brought to a large capacity, the necessary cooling capacity can be obtained even with low-speed drive. Also, a necessary heating capacity can be obtained by the fixed-capacity type warm water pump 11 being operated at twice the speed of the compressor 1.

On the other hand, in order to make the capacity of the variable-capacity compressor 1 small to obtain the necessary cooling capacity, the compressor 1 is operated at a high speed. Here, because the pulley ratio of the belt 13 is still fixed, in association with the necessary compressor speed Nmc the warm water pump 11 operates at a high speed. Because the drive torque of the warm water pump 11 is small, this is not a problem With the second embodiment of the present invention, the necessary compressor speed Nmc and the necessary warm water pump speed Nmw of step 400 in FIG. 7 are each calculated independently. Also, the compressor 1 and the warm water pump 11 are operated at a necessary speed during motor drive. Therefore, the speed of the warm water pump 11 in winter can be kept down to the same level as the speed of the compressor 1 in summer. Therefore, with the second preferred embodiment, when the compressor 1 and the warm water pump 11 are driven in a hybrid fashion by the vehicle engine 10 and, the motor/generator 12, the compressor 1 and the warm water pump 11 can be driven at optimum speeds at all times.

Figure 8:
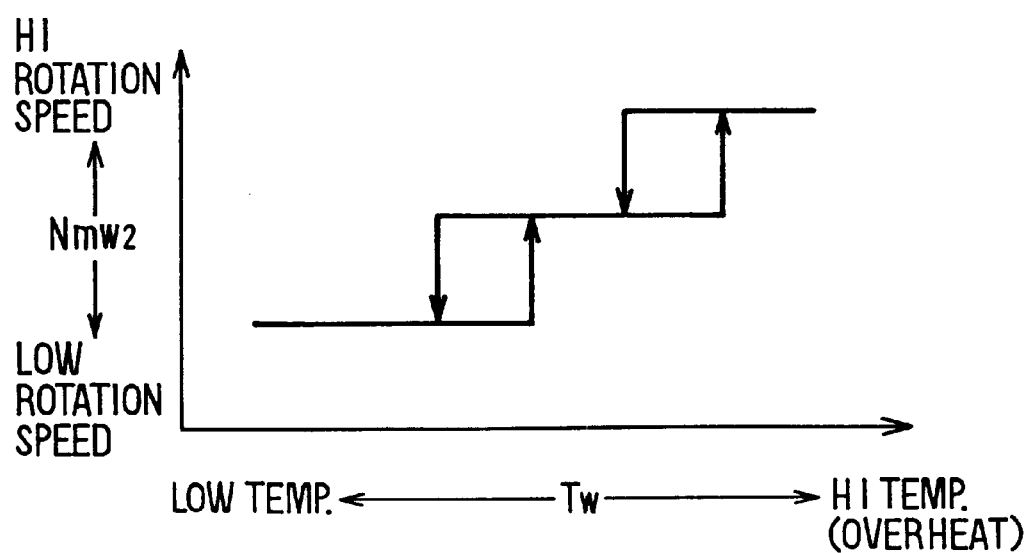
FIG. 8 is a graphical view showing a second necessary warm water pump speed for a motor drive-control device according to a third embodiment of the present invention.

FIG. 8 is a chart showing a, method for calculating the necessary warm water pump speed Nmw according to a third embodiment of the present invention. In this embodiment, a first necessary warm water pump speed Nmw1 is determined on the basis of the necessary heating capacity Qh by the same method as in the first and second preferred embodiments. In addition, a second necessary warm water pump speed Nmw2, which rises in steps with rising warm water temperature Tw of the vehicle engine 10, is determined as shown in FIG. 8. Then, of the first and second necessary warm water pump speeds Nmw1 and Nmw2, the higher is finally set as the necessary warm water pump speed Nmw, as shown by the following Exp. 5.

$$Nmw = MAX(Nmw1, Nmw2) \qquad \text{Exp. 5}$$

The necessary warm water pump speed Nmw is determined not only with respect to the necessary-heating capacity Qh of winter but also with respect to the warm water temperature Tw of the vehicle engine 10. Even in conditions wherein overheating is likely to occur, such as during engine 10 shut down immediately after running under a high load, increasing pump motor speed drive in advance of the warm water temperature Tw, rise, can help prevent overheating of vehicle engine 10. This is accomplished by increasing warm water flow to the radiator (not shown) before shut down, thereby reducing temperature.

FIG. 1 and FIG. 6 illustrates the control of the motor/generator 12 being carried out by an air-conditioning control unit 16. Alternatively, control of the motor/generator 12 may be carried out by an engine control unit (not shown).

While the above-described embodiments refer to examples of usage of the present invention, it is understood that the present invention may be applied to other usage, modifications and variations of the same, and is not limited to the disclosure provided herein.

What is claimed is:

1. A motor drive-control device for drive-controlling a plurality of auxiliary devices with a single motor, said plurality of auxiliary devices being accessory devices for a vehicle, said motor drive-control device comprising:

necessary speed calculating means for calculating necessary speeds of each of said plurality of auxiliary devices;

motor speed setting means for setting a highest of said necessary speeds as a motor speed; and motor control means for controlling the motor to the speed set by the motor speed setting means;

wherein one of said plurality of auxiliary devices controls cooling capacity of a vehicle and a second of the auxiliary devices controls heating capacity of a vehicle, wherein the necessary speed calculating means calculates the necessary speeds as a function of necessary cooling capacity and a necessary heating capacity.

2. A motor drive-control device according to claim 1, wherein said device controlling cooling capacity is a compressor, said compressor being part of a refrigeration cycle, the device controlling heating capacity being a warm water pump for circulating warm water.

3. A motor drive-control device according to claim 2, further comprising:

an evaporator through which refrigerant of the refrigerating cycle circulates; and a heater core through which warm water is circulated by the warm water pump;

wherein said heater core and said evaporator are disposed in an air-conditioning case, said air conditioning case having a passage through which air-conditioning air flows.

4. A motor drive-control device according to claim 3, further comprising a temperature adjusting means for adjusting an amount of heat delivered by the heater core to a passenger compartment, said temperature adjusting means for adjusting a temperature at which air-conditioning air is blown into said passenger compartment.

5. A motor drive-control device according to claim 3, further comprising a vehicle engine, wherein the motor and the compressor and the warm water pump are driven by the vehicle engine when said vehicle is moving, said motor acting as a generator when being driven by said vehicle engine, said motor driving said compressor and said warm water pump when said vehicle is stopped.

6. A motor drive-control device for drive-controlling a plurality of auxiliary devices with a single motor, said plurality of auxiliary devices being accessory devices for a vehicle, said motor drive-control device comprising:

necessary speed calculating means for calculating necessary speeds of each of said plurality of auxiliary devices;

motor speed setting means for setting a highest of said necessary speeds as a motor speed; and motor control means for controlling the motor to the speed set by the motor speed setting means;

wherein, one of the plurality of auxiliary devices is a quantity variable compressor for an air conditioner, the plurality of auxiliary devices can also be driven by a vehicle engine, and capacity of the compressor is set large when the plurality of auxiliary devices are driven by the vehicle engine and the capacity of the compressor is set small when the plurality of auxiliary devices are driven by the motor.

* * * * *